United States Patent

Riff

[15] 3,641,416
[45] Feb. 8, 1972

[54] HYDRODYNAMIC CHARGING SYSTEM
[72] Inventor: James A. Riff, Chicago, Ill.
[73] Assignee: Motorola, Inc., Franklin Park, Ill.
[22] Filed: Oct. 8, 1969
[21] Appl. No.: 864,648

[52] U.S. Cl..................................320/61, 290/40, 290/50
[51] Int. Cl..........................................................H02j 7/14
[58] Field of Search..............320/5, 14, 61, 46, 2; 319/139; 290/50, 40, 30; 60/52, 15

[56] References Cited

UNITED STATES PATENTS

| | | | |
|---|---|---|---|
| 3,193,751 | 7/1965 | Cadiou | 320/61 X |
| 3,283,165 | 11/1966 | Bloch | 290/30 R |
| 3,345,517 | 10/1967 | Smith | 290/30 R |
| 3,056,036 | 9/1962 | Gardner | 290/40 |
| 3,118,281 | 1/1964 | Gros | 290/40 UX |
| 3,280,397 | 10/1966 | Bruns | 320/14 UX |
| 3,385,278 | 5/1968 | Johnson, Jr. et al. | 290/40 |
| 3,424,916 | 1/1969 | Fenley | 290/40 |
| 3,512,072 | 5/1970 | Kaeazija et al. | 320/14 X |

*Primary Examiner*—J. D. Miller
*Assistant Examiner*—John M. Gunther
*Attorney*—Mueller & Aichele

[57] ABSTRACT

The hydraulic power source of a motor vehicle for supplying hydraulic power to operate a power steering mechanism or other hydraulic equipment of the vehicle is also utilized to drive a hydraulic motor, which in turn is coupled to an alternator through a direct mechanical drive, thereby eliminating the driving belt normally utilized to operate the alternator of the vehicle. The alternator operates as a current source to charge the vehicle battery. The hydraulic system provides sufficient pressure to drive the alternator at its full output even for an idling engine. When electrical power is not required by the system, the fluid supply powering the motor which drives the alternator may be shut off automatically, thereby extending the system life.

5 Claims, 1 Drawing Figure

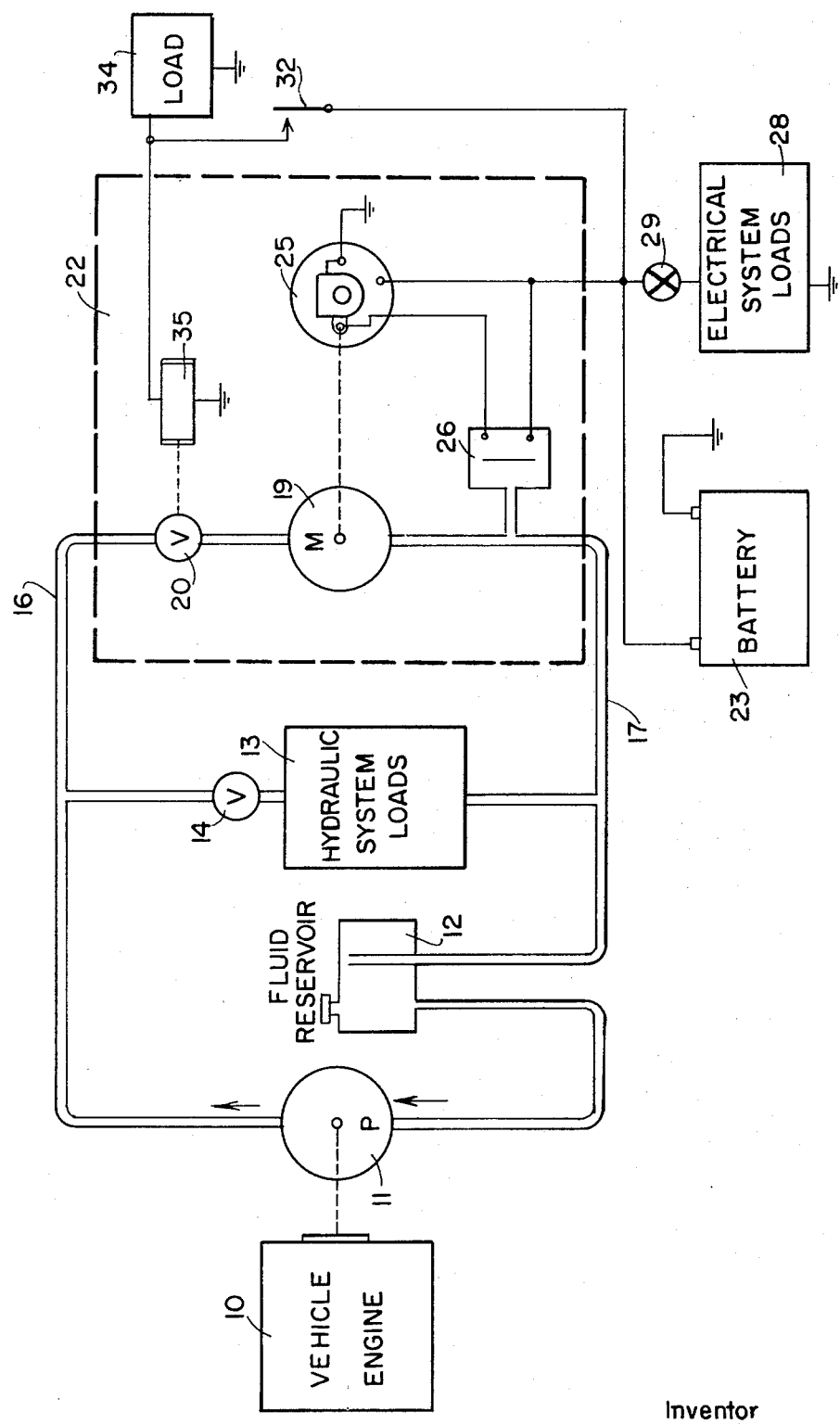

HYDRODYNAMIC CHARGING SYSTEM

BACKGROUND OF THE INVENTION

The battery charging systems of most vehicles such as automobiles, trucks, construction equipment and the like, generally uses a generator or alternator current producing source for charging the battery, with the generator or alternator being belt driven by the vehicle engine. The use of belt-driven generators and alternators is subject to unpredictable and expensive belt drive failures, caused by breakage of the belt or slipping of the belt; so that for proper operation of such systems, regular maintenance or checking of the drive belt is necessary.

In addition, during periods when the vehicle engine is idling, most belt-driven alternator or generator systems do not produce a sufficiently high output to operate substantial electrical loads from the vehicle battery. Thus, if it is desired to operate such substantial electrical loads from the vehicle battery during idling periods of the engine, such as is often the case with respect to construction equipment, a relatively large capacity generator or alternator must be employed to provide a sufficient output at the low idling speed of the engine. When the engine is operated at higher speeds, however, the full output then produced by such a large capacity alternator or generator is not required.

Another solution has been to drive the generator or alternator at a speed which is relatively high compared with the speed of the engine, so that the generator or alternator output attains a maximum value at relatively low engine speeds. When the speed of the engine is increased, however, the speed of the generator or alternator substantially exceeds that required for this maximum output. In addition, excessively high speed operation causes excessive wear of the generator and alternator motor moving parts and a danger of centrifugal decomposition.

Another disadvantage of belt-driven generators and alternators in vehicles is that the inherent nature of the belt drive requires the mounting of the alternator or generator in or near the engine compartment; so that it often is necessary to remove the alternator or generator before the desired maintenance on the vehicle engine can be accomplished.

SUMMARY OF THE INVENTION

Accordingly, it is an object of this invention to provide an improved battery charging system for a vehicle.

It is another object of this invention to provide an alternator- or generator-operating system which is fluid driven from a hydraulic or pneumatic power source operated by the vehicle engine.

It is a further object of this invention to provide a driving system for an alternator or generator of a vehicle which utilizes a hydraulic power source already present in the vehicle for operating other hydraulic loads.

It is yet another object of this invention to provide a driving source for a generator or alternator in a vehicle which permits increased flexibility in the location of the generator or alternator.

In accordance with a preferred embodiment of this invention, a vehicle engine is used to operate a fluid pressure producing means, with the output of the fluid pressure producing means driving a fluid motor, which in turn drives an electrical current producing means for supplying charging current to the vehicle battery. In a more specific form, the fluid pressure producing means may be an existing hydraulic pump already present in the vehicle, such as the power steering pump of the vehicle, and the current-producing means may be in the form of an alternator or generator which is directly coupled through a shaft to the fluid driven motor, thereby eliminating the belt drive normally used to drive the generator or alternator. This type of hydraulically operated device permits greater flexibility in the location of the generator or alternator within the vehicle and eliminates the problems conventionally associated with belt drive devices.

BRIEF DESCRIPTION OF THE DRAWING

The sole FIGURE of the drawing is a block diagram of a preferred embodiment of the invention.

DETAILED DESCRIPTION

Referring now to the drawing, there is shown a hydrodynamic charging system for driving the alternator of a vehicle, which may be of any suitable type, such as a passenger automobile, a truck, or a specialized construction equipment vehicle. In such vehicles, a vehicle engine is utilized as the primary source of driving power for the vehicle; and this engine is indicated as engine 10 in the drawing. In most such vehicles, the engine 10 also continuously operates a hydraulic pump 11 which is supplied with fluid from a fluid reservoir 12 and supplies hydraulic fluid under pressure to operate hydraulic system loads 13, such as the power steering of an automobile, or the power shovel of a tractor, or the like. The hydraulic system loads 13 are controlled from the pump 11 by means of a fluid valve 14, which may be operated in any suitable manner to supply fluid provided by the pump 11 to the hydraulic system loads 13.

In addition to utilizing the pump 11 to supply hydraulic fluid to the loads 13, additional hydraulic supply and return lines 16 and 17 are provided for driving a hydraulic motor 19 through a solenoid-actuated valve 20. The motor 19 and valve 20 are part of a hydrodynamic charging package 22, which is used to provide electrical charging current to a storage battery 23 of the type commonly used in vehicles of the type described. The motor 19 may be coupled by a rigid or flexible drive shaft to the drive shaft of a conventional generator or alternator 25, being illustrated in the drawing as an alternator. By utilizing a hydraulically powered system of this type, it is possible to eliminate the conventional belt drive by which the alternator 25 normally is driven directly from the vehicle engine 10. When the belt drive is eliminated, the location of the current producing charging package 22 may be anywhere in the vehicle which may be reached by the supply and return lines 16 and 17 of the hydraulic system.

The valve 20 is normally open, permitting fluid to flow under pressure from the pump 11 through the supply line 16 to the motor 19 for driving or rotating the motor 19. The hydraulic system is adjusted so that the motor 19 operates at a sufficient number of revolutions per minute to produce a full output of the alternator 25, even at idling speeds of the vehicle engine 10. In practical embodiments of the invention which have been tested, it has been found that a minimum of 300 p.s.i. fluid pressure supplied to the motor 19 is necessary to obtain full output from an alternator of the type used in a conventional passenger automobile. The conventional automobile engine operates at an idling speed sufficient to provide approximately 400 p.s.i. pressure to the motor 19. This pressure increases to approximately 2,000 p.s.i. during normal operation of the automobile.

For exciting the alternator 25 and connecting it to the battery 23 to permit the alternator current-producing system 25 to charge the battery 23, a pressure-sensitive switch 26 is connected to the hydraulic fluid return line 17 between the fluid reservoir 12 and the motor 19. Thus, when sufficient hydraulic pressure is present to operate the motor 19, the switch 26 is closed, exciting the alternator system 25 and connecting it to the battery 23. The alternator system 25 then charges the battery 23 in a conventional manner.

Electrical system loads 28 of the vehicle are connected to the junction of the alternator system output and the battery 23 through a suitable switch or series of switches 29. This portion of the system is conventional and may take a number of different forms. In addition, there is shown an ignition switch 32 for connecting the battery 23 to a load 34 operated through the ignition switch 32, which is closed in normal operation of the vehicle.

The current supplied through the switch 32 also flows through a charging system cutout solenoid 35, which controls the operation of the solenoid operated valve 20 in the supply line 16 for the motor 19. In a 12-volt system, it has been found desirable to adjust the solenoid operated valve 20 and the solenoid 35; so that when the charge on the battery 23 reaches approximately 14.5 volts, the solenoid 35 has sufficient current flowing through it to operate the solenoid valve 20, closing the input line 16 to the motor 19. When this occurs, then, the motor 19 no longer is operated and rotation of the alternator 25 in the alternator system is terminated. The parameters of the solenoid 35 also are such that when the system voltage decays to approximately 12.4 volts, the solenoid 35 is released, opening the valve 20. This causes the motor 19 to resume operation, and the alternator system 25 again supplied charging current to the battery 23.

The solenoid-operated valve 20, the solenoid 35 and the excitation pressure switch 26 are optional and may be eliminated if so desired. The use of the solenoid 35 and solenoid-operated valve 20, however, permits a longer life for the alternator system 25, due to the fact that the alternator system 25 is cut off when not needed. In addition, unnecessary loading of the fluid pump 11 also is prevented.

Because the charging system 22 no longer must be mounted at a particular place within the engine compartment so that it can be driven by a belt, it is possible to locate the charging system 22 directly adjacent the battery 23 to reduce the line drop and temperature sensing errors between the charging system 22 and the battery 23. In addition, the alternator or generator system 25 should have an increased bearing life, since no belt load on the drive shaft of the alternator 25 exists when the drive shaft of the alternator 25 is directly, mechanically coupled to the drive shaft of the fluid motor 19. Although the hydraulic power source has been illustrated as being obtained from the power source used to operate other hydraulic system loads in the vehicle, if no other hydraulic system loads are present, a separate hydraulic pump could be provided for operating the current generator system 22. The use of this hydraulically operated alternator system permits greater system flexibility in the design of the electrical system of the vehicle, thereby freeing the vehicle designer to locate the alternator and battery in other areas of the vehicle than the engine compartment.

I claim:

1. For use in conjunction with a vehicle having an engine as a prime source of power, with the operation of the engine being variable from an idle speed to a maximum speed, the vehicle having a battery for providing power for operating electrical system loads, a battery charging system including in combination:
   a fluid-driven motor operated by fluid under pressure;
   fluid pressure producing means continuously operated by said engine for continuously supplying fluid under pressure so long as said engine is operating; means coupling the fluid pressure producing means with said motor for supplying fluid from the pressure producing means to said motor;
   electrical current producing means driven by the motor for supplying charging current to the battery;
   means coupled with the battery and responsive to the voltage of the battery for interrupting the fluid supplied by the coupling means to the fluid driven motor when the battery voltage exceeds a predetermined amount and for reestablishing the supply of fluid by the coupling means to the fluid-driven motor when the battery voltage drops below a second predetermined amount; and
   means responsive to the pressure of the fluid supplied to the motor to couple the electrical current producing means to the battery only when a predetermined fluid pressure is present.

2. The combination according to claim 1 wherein the fluid pressure producing means is a hydraulic pump and wherein the fluid-driven motor is a hydraulic motor mechanically coupled to the electrical current producing means.

3. The combination according to claim 2 wherein the hydraulic pump provides hydraulic fluid pressure for operating other hydraulic system loads in said vehicle.

4. The combination according to claim 3 wherein the electrical current producing means includes an alternator current source driven by a shaft directly coupled to the hydraulic motor.

5. The combination according to claim 1 wherein the means for interrupting the fluid supplied by the coupling means to the motor is a solenoid-actuated valve means for interrupting the fluid supplied by the coupling means to the motor in response to said first predetermined battery voltage and for reestablishing the fluid supplied by the coupling means to the motor in response to the second predetermined battery voltage.

* * * * *